(12) United States Patent
Nitta et al.

(10) Patent No.: US 11,262,543 B2
(45) Date of Patent: Mar. 1, 2022

(54) IMAGING LENS INCLUDING SIX LENSES OF +−++0− REFRACTIVE POWERS

(71) Applicant: TOKYO VISIONARY OPTICS CO., LTD., Tokyo (JP)

(72) Inventors: Koji Nitta, Tokyo (JP); Masaya Hashimoto, Sukagawa (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 0 days.

(21) Appl. No.: 16/513,317

(22) Filed: Jul. 16, 2019

(65) Prior Publication Data
US 2020/0209553 A1    Jul. 2, 2020

(30) Foreign Application Priority Data

Jul. 17, 2018 (JP) .............................. JP2018-133904

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC ............... G02B 13/0045; G02B 9/62
See application file for complete search history.

(56) References Cited

U.S. PATENT DOCUMENTS

2015/0260961 A1\* 9/2015 Ota ................... G02B 13/0045
359/713
2016/0170182 A1 6/2016 Tanaka

FOREIGN PATENT DOCUMENTS

JP    2016-114803 A    6/2016

\* cited by examiner

*Primary Examiner* — Wen Huang
(74) *Attorney, Agent, or Firm* — Hamre, Schumann, Mueller & Larson, P.C.

(57) ABSTRACT

There is provided an imaging lens with excellent optical characteristics which satisfies demand of the wide field of view, the low-profileness and the low F-number. An imaging lens comprises, in order from an object side to an image side, a first lens having a convex surface facing the object side near an optical axis and positive refractive power, a second lens having negative refractive power near the optical axis, a third lens, a fourth lens, a fifth lens being double-sided aspheric lens, and a sixth lens having a concave surface facing the image side near the optical axis and negative refractive power, wherein an image-side surface of the sixth lens is formed as an aspheric surface having at least one off-axial pole point, an image-side surface of the third lens is a convex surface facing the image side near the optical axis, the fourth lens has positive refractive power near the optical axis, and predetermined conditional expressions are satisfied.

11 Claims, 7 Drawing Sheets

IMAGING LENS INCLUDING SIX LENSES OF +−++0− REFRACTIVE POWERS

BACKGROUND OF THE INVENTION

Field of the Invention

The present invention relates to an imaging lens which forms an image of an object on a solid-state image sensor such as a CCD sensor or a C-MOS sensor used in an imaging device, and more particularly relates to an imaging lens which is built in a smartphone and a mobile phone which become increasingly compact and excellent in performance, an information terminal such as a PDA (Personal Digital Assistant), a game console, PC and a robot, and moreover, a home appliance with camera function, a monitoring camera and an automobile.

Description of the Related Art

In recent years, it becomes common that camera function is mounted in a home appliance, information terminal equipment, an automobile and public transportation. Demand of products with the camera function is more increased, and development of products is being made accordingly.

The imaging lens mounted in such equipment is required to be compact and have high-resolution performance.

As a conventional imaging lens aiming high performance, for example, the imaging lens disclosed in Patent Document 1 below has been known.

Patent Document 1 (JP2016-114803A) discloses an imaging lens comprising, in order from an object side, a first lens having a convex surface facing the object side and positive refractive power, a second lens having negative refractive power, a third lens having a convex surface facing the object side, a fourth lens having positive refractive power, a fifth lens having negative refractive power, and a sixth lens having negative refractive power.

SUMMARY OF THE INVENTION

However, in lens configurations disclosed in the Patent Document 1, when wide field of view, low-profileness and low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view, the low-profileness and the low F-number in well balance and excellently corrects aberrations.

Regarding terms used in the present invention, "a convex surface", "a concave surface" or "a plane surface" of lens surfaces implies that a shape of the lens surface near an optical axis (paraxial portion). "Refractive power" implies the refractive power near the optical axis. "A pole point" implies an off-axial point on an aspheric surface at which a tangential plane intersects the optical axis perpendicularly. "Total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens having a convex surface facing the object side near an optical axis and positive refractive power, a second lens having negative refractive power near the optical axis, a third lens, a fourth lens, a fifth lens being double-sided aspheric lens, and a sixth lens having a concave surface facing the image side near the optical axis and negative refractive power, wherein an image-side surface of the sixth lens is formed as an aspheric surface having at least one off-axial pole point.

According to the imaging lens having the above-described configuration, the first lens achieves wide field of view and low-profileness by strengthening the refractive power. The second lens properly corrects spherical aberration and chromatic aberration occurring at the first lens. The third lens properly corrects the spherical aberration, coma aberration and distortion while maintaining the low-profileness. The fourth lens properly corrects the astigmatism, field curvature and distortion while maintaining the low-profileness. The fifth lens properly corrects aberrations at a peripheral area. The sixth lens properly corrects the chromatic aberration, the astigmatism, the field curvature and the distortion. The image-side surface of the sixth lens has the concave surface facing the image side near the optical axis, and the field curvature and the distortion can be properly corrected and light ray incident angle to an image sensor can be properly controlled by forming the aspheric surface having at least one off-axial pole point.

According to the imaging lens having the above-described configuration, it is preferable that an object-side surface of the third lens is a convex surface facing the object side near the optical axis.

When the object-side surface of the third lens is the convex surface facing the object side near the optical axis, the astigmatism and the distortion can be properly corrected.

According to the imaging lens having the above-described configuration, it is preferable that an image-side surface of the third lens is formed as a convex surface facing the image side near the optical axis.

When the image-side surface of the third lens is formed as the convex surface facing the image side near the optical axis, light ray incident angle to the image-side surface of the third lens can be appropriately controlled and the astigmatism, the field curvature and the distortion can be properly corrected.

According to the imaging lens having the above-described configuration, it is preferable that the fourth lens has positive refractive power near the optical axis.

When the refractive power of the fourth lens is positive, the low-profileness is more facilitated.

According to the imaging lens having the above-described configuration, it is preferable that an object-side surface and an image-side surface of the fifth lens are formed as plane surfaces near the optical axis.

When the object-side surface and the image-side surface of the fifth lens are plane surfaces near the optical axis, the astigmatism, the field curvature and the distortion at the peripheral area can be properly corrected by forming aspheric surfaces on both sides without affecting refractive power of an overall optical system of the imaging lens.

According to the imaging lens having the above-described configuration, it is preferable that a below conditional expression (1) is satisfied:

$$5.00 < (D1/f1) \times 100 < 10.00 \quad (1)$$

where

D1: a thickness along the optical axis of the first lens, and f1: a focal length of the first lens.

The conditional expression (1) defines an appropriate range of a thickness along the optical axis of the first lens. When a value is below the upper limit of the conditional expression (1), the thickness along the optical axis of the first lens is suppressed from being too large, and an air gap on the image side of the first lens can be easily secured. As a result, the low-profileness can be achieved. On the other hand, when the value is above the lower limit of the conditional expression (1), the thickness along the optical axis of the first lens is suppressed from being too small, and formability of the lens becomes excellent. Furthermore, by satisfying the conditional expression (1), the coma aberration can be properly corrected.

According to the imaging lens having the above-described configuration, it is preferable that a below conditional expression (2) is satisfied:

$$2.20<(T2/TTL)\times100<4.70 \quad (2)$$

where

T2: a distance along the optical axis from an image-side surface of the second lens to an object-side surface of the third lens, and TTL: a total track length.

The conditional expression (2) defines an appropriate range of the distance along the optical axis between the second lens and the third lens. By satisfying the conditional expression (2), the astigmatism and the distortion can be properly corrected.

According to the imaging lens having the above-described configuration, it is preferable that a below conditional expression (3) is satisfied:

$$2.50<(T5/TTL)\times100<4.70 \quad (3)$$

where

T5: a distance along the optical axis from an image-side surface of the fifth lens to an object-side surface of the sixth lens, and TTL: a total track length.

The conditional expression (3) defines an appropriate range of the distance along the optical axis between the fifth lens and the sixth lens. By satisfying the conditional expression (3), the coma aberration, the astigmatism and the distortion can be properly corrected.

According to the imaging lens having the above-described configuration, it is preferable that a below conditional expression (4) is satisfied:

$$0.15<vd5/vd6<0.55 \quad (4)$$

where vd5: an abbe number at d-ray of the fifth lens, and vd6: an abbe number at d-ray of the sixth lens.

The conditional expression (4) defines an appropriate range of the respective abbe numbers at d-ray of the fifth lens and sixth lens. By satisfying the conditional expression (4), the chromatic aberration can be properly corrected.

According to the imaging lens having the above-described configuration, it is preferable that a below conditional expression (5) is satisfied:

$$7.80<(D3/f3)\times100<14.00 \quad (5)$$

where

D3: a thickness along the optical axis of the third lens, and f3: a focal length of the third lens.

The conditional expression (5) defines an appropriate range of a thickness along the optical axis of the third lens. When a value is below the upper limit of the conditional expression (5), the thickness along the optical axis of the third lens is suppressed from being too large, and air gaps on the object side and the image side of the third lens can be easily secured. As a result, the low-profileness can be realized. On the other hand, when the value is above the lower limit of the conditional expression (5), the thickness along the optical axis of the third lens is suppressed from being too small, and the formability of the lens becomes excellent. Furthermore, by satisfying the conditional expression (5), the astigmatism and the distortion can be properly corrected.

According to the imaging lens having the above-described configuration, it is preferable that a below conditional expression (6) is satisfied:

$$-1.15<r8/r11<-0.70 \quad (6)$$

where r8: paraxial curvature radius of an image-side surface of the fourth lens, and r11: paraxial curvature radius of an object-side surface of the sixth lens.

The conditional expression (6) defines relationship between paraxial curvature radii of the image-side surface of the fourth lens and the object-side surface of the sixth lens. By satisfying the conditional expression (6), refractive powers of the image-side surface of the fourth lens and the object-side surface of the sixth lens are suppressed from being excessive. As a result, the astigmatism and the distortion can be properly corrected.

According to the imaging lens having the above-described configuration, it is preferable that a below conditional expression (7) is satisfied:

$$5.00<(D4/f4)\times100<19.00 \quad (7)$$

where

D4: a thickness along the optical axis of the fourth lens, and f4: a focal length of the fourth lens.

The conditional expression (7) defines an appropriate range of a thickness along the optical axis of the fourth lens. When a value is below the upper limit of the conditional expression (7), the thickness along the optical axis of the fourth lens is suppressed from being too large, and air gaps on the object side and the image side of the fourth lens can be easily secured. As a result, the low-profileness can be realized. On the other hand, when the value is above the lower limit of the conditional expression (7), the thickness along the optical axis of the fourth lens is suppressed from being too small, and the formability of the lens becomes excellent.

Furthermore, by satisfying the conditional expression (7), the astigmatism and the distortion can be properly corrected.

According to the imaging lens having the above-described configuration, it is preferable that a below conditional expression (8) is satisfied:

$$2.50<(T1/TTL)\times100<6.50 \quad (8)$$

where

T1: a distance along the optical axis from an image-side surface of the first lens to an object-side surface of the second lens, and TTL: a total track length.

The conditional expression (8) defines an appropriate range of the distance along the optical axis between the first lens and the second lens. By satisfying the conditional expression (8), the coma aberration, the astigmatism and the distortion can be properly corrected.

According to the imaging lens having the above-described configuration, it is preferable that a below conditional expression (9) is satisfied:

$$0.20 < T2/T3 < 0.45 \tag{9}$$

where

T2: a distance along the optical axis from an image-side surface of the second lens to an object-side surface of the third lens, and T3: a distance along the optical axis from an image-side surface of the third lens to an object-side surface of the fourth lens.

The conditional expression (9) defines an appropriate range of a distance between the second lens and the third lens and a distance between the third lens and the fourth lens. By satisfying the conditional expression (9), difference of the distance between the second lens and the third lens and the distance between the third lens and the fourth lens is suppressed from being large, and the low-profileness is achieved. Furthermore, by satisfying the conditional expression (9), the coma aberration, the astigmatism and the distortion can be properly corrected.

According to the imaging lens having the above-described configuration, it is preferable that a below conditional expression (10) is satisfied:

$$0.80 < f3/f4 < 1.65 \tag{10}$$

where f3: a focal length of the third lens, and f4: a focal length of the fourth lens.

The conditional expression (10) defines an appropriate range of refractive powers of the third lens and the fourth lens. By satisfying the conditional expression (10), positive refractive power can be appropriately balanced against the third lens and the fourth lens. As a result, the low-profileness can be realized. Furthermore, by satisfying the conditional expression (10), the spherical aberration, the coma aberration, the field curvature and the distortion can be properly corrected.

According to the imaging lens having the above-described configuration, it is preferable that a below conditional expression (11) is satisfied:

$$1.70 < |r2|/f \tag{11}$$

where r2: paraxial curvature radius of an image-side surface of the first lens, and f: a focal length of the overall optical system of the imaging lens.

The conditional expression (11) defines an appropriate range of the paraxial curvature radius of the image-side surface of the first lens. By satisfying the conditional expression (11), spherical aberration occurring at this surface is suppressed and sensitivity to a manufacturing error can be easily reduced.

According to the imaging lens having the above-described configuration, it is preferable that a below conditional expression (12) is satisfied:

$$1.20 < r3/f < 3.00 \tag{12}$$

where r3: paraxial curvature radius of an object-side surface of the second lens, and f: a focal length of the overall optical system of the imaging lens.

The conditional expression (12) defines an appropriate range of the paraxial curvature radius of the object-side surface of the second lens. When a value is below the upper limit of the conditional expression (12), the astigmatism and the coma aberration can be properly corrected. On the other hand, when the value is above the lower limit of the conditional expression (12), the distortion can be properly corrected.

According to the imaging lens having the above-described configuration, it is preferable that a below conditional expression (13) is satisfied:

$$0.20 < r11/f < 0.60 \tag{13}$$

where r11: paraxial curvature radius of an object-side surface of the sixth lens, and f: a focal length of the overall optical system of the imaging lens.

The conditional expression (13) defines an appropriate range of the paraxial curvature radius of the object-side surface of the sixth lens. When a value is below the upper limit of the conditional expression (13), the coma aberration can be properly corrected. On the other hand, when the value is above the lower limit of the conditional expression (13), the field curvature and the distortion can be properly corrected.

According to the imaging lens having the above-described configuration, it is preferable that the fourth lens, the fifth lens and the sixth lens has positive composite refractive power near the optical axis, and more preferable that a below conditional expression (14) is satisfied:

$$3.00 < f456/f < 90.00 \tag{14}$$

where f456: a composite focal length of the fourth lens, the fifth lens and the sixth lens, and f: the focal length of the overall optical system of the imaging lens.

When the composite refractive power of the fourth lens, the fifth lens and the sixth lens is positive, it is favorable for realizing the low-profileness. The conditional expression (14) defines an appropriate range of the composite refractive power of the fourth lens, the fifth lens and the sixth lens. When a value is below the upper limit of the conditional expression (14), the positive composite refractive power of the fourth lens, the fifth lens and the sixth lens become appropriate, and the low-profileness can be achieved. On the other hand, when the value is above the lower limit of the conditional expression (14), the astigmatism, the field curvature and the distortion can be properly corrected.

According to the imaging lens having the above-described configuration, it is preferable that a below conditional expression (15) is satisfied:

$$4.00 < (T3/TTL) \times 100 < 16.50 \tag{15}$$

where

T3: a distance along the optical axis from an image-side surface of the third lens to an object-side surface of the fourth lens, and TTL: a total track length.

The conditional expression (15) defines an appropriate range of the distance along the optical axis between the third lens and the fourth lens. By satisfying the conditional expression (15), the distortion can be properly corrected.

According to the imaging lens having the above-described configuration, it is preferable that a below conditional expression (16) is satisfied:

$$-0.90 < r5/r6 < -0.25 \qquad (16)$$

where r5: paraxial curvature radius of an object-side surface of the third lens, and r6: paraxial curvature radius of an image-side surface of the third lens.

The conditional expression (16) defines relationship between paraxial curvature radii of the object-side surface and the image-side surface of the third lens. By satisfying the conditional expression (16), the astigmatism, the field curvature and the distortion can be properly corrected.

According to the imaging lens having the above-described configuration, it is preferable that a below conditional expression (17) is satisfied:

$$-4.90 < r6/f < -0.90 \qquad (17)$$

where r6: paraxial curvature radius of an image-side surface of the sixth lens, and f: a focal length of the overall optical system of the imaging lens.

The conditional expression (17) defines an appropriate range of the paraxial curvature radius of the image-side surface of the third lens. By satisfying the conditional expression (17), the coma aberration, the astigmatism, the field curvature and the distortion can be properly corrected.

According to the imaging lens having the above-described configuration, it is preferable that a below conditional expression (18) is satisfied:

$$TTL/EPd \leq 3.10 \qquad (18)$$

where

TTL: a total track length, and

EPd: an entrance pupil diameter.

The conditional expression (18) defines relationship between the total track length and the entrance pupil diameter. By satisfying the conditional expression (18), the total track length can be shortened, decrease in light quantity at the peripheral area can be suppressed and an image having sufficient brightness from a center to a peripheral area can be obtained.

Effect of Invention

According to the present invention, there can be provided an imaging lens with high resolution which satisfies demand of the wide field of view, the low-profileness and the low F-number in well balance, and properly corrects aberrations.

DETAILED DESCRIPTION OF THE PREFERRED EMBODIMENT

Hereinafter, the preferred embodiments of the present invention will be described in detail referring to the accompanying drawings.

FIGS. 1, 3, 5, 7, 9 and 11 are schematic views of the imaging lenses in Examples 1 to 6 according to the embodiments of the present invention, respectively.

Figure 1:
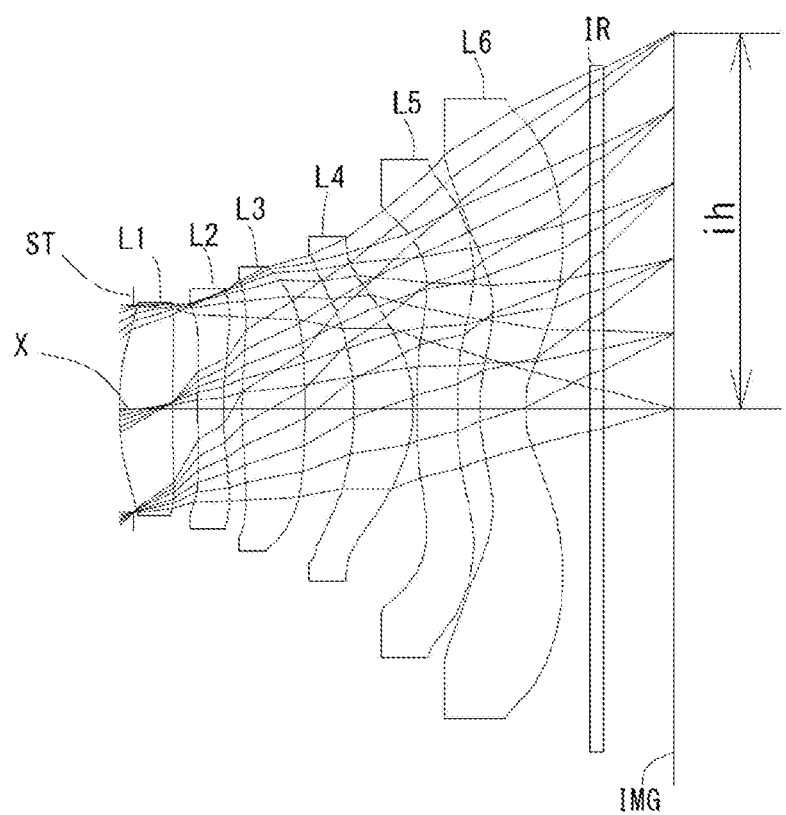
FIG. 1 is a schematic view showing an imaging lens in Example 1 according to the present invention.

As shown in FIG. 1, the imaging lens according to the present embodiment comprises, in order from an object side to an image side, a first lens L1 having a convex surface facing the object side near an optical axis X and positive refractive power, a second lens L2 having negative refractive power near the optical axis X, a third lens L3, a fourth lens L4, a fifth lens L5 being double-sided aspheric lens, and a sixth lens L6 having a concave surface facing the image side near the optical axis X and negative refractive power, wherein an image-side surface of the sixth lens L6 is formed as an aspheric surface having at least one off-axial pole point.

A filter IR such as an IR cut filter and a cover glass are arranged between the sixth lens L6 and an image plane IMG (namely, the image plane of an image sensor). The filter IR is omissible.

By arranging an aperture stop ST on the object side of the first lens L1, correction of aberrations and control of an incident angle of the light ray of high image height to the image sensor become facilitated.

The first lens L1 has the positive refractive power and has a meniscus shape having a convex surface facing the object side and a concave surface facing the image side near the optical axis X. Therefore, spherical aberration, astigmatism and distortion can be properly corrected. A shape of the first lens L1 may be a biconvex shape having the convex surfaces facing the object side and the image side near the optical axis X as in the Examples 3 and 6 shown in FIGS. 5 and 11. In this case, positive refractive power on the both sides is favorable for realizing the low-profileness. Furthermore, a configuration of the biconcave shape suppresses curvature from being large, and reduces sensitivity to a manufacturing error.

The second lens L2 has the negative refractive power and has a meniscus shape having a convex surface facing the object side and a concave surface facing the image side near the optical axis X. Therefore, the spherical aberration, chromatic aberration, the astigmatism and the distortion can be properly corrected.

The third lens L3 has the positive refractive power and has a biconvex shape having convex surfaces facing the object side and the image side near the optical axis X. Therefore, the spherical aberration, coma aberration, the astigmatism, the field curvature and the distortion can be properly corrected. Furthermore, a configuration of the biconvex shape suppresses curvature from being large, and reduces sensitivity to a manufacturing error.

The fourth lens L4 has the positive refractive power and has a meniscus shape having a concave surface facing the object side and a convex surface facing the image side near the optical axis X. Therefore, a light ray incident angle to the fourth lens L4 becomes appropriate, and the astigmatism, the field curvature and the distortion can be properly corrected.

The fifth lens L5 has plane surfaces facing the object side and the image side near the optical axis X and substantially has no refractive power near the optical axis X. Therefore, the astigmatism, the field curvature and the distortion at a peripheral area can be properly corrected by the aspheric surfaces on both sides without affecting a focal length of the overall optical system of the imaging lens.

The sixth lens L6 has the negative refractive power and has the meniscus shape having a convex surface facing the object side and a concave surface facing the image side near the optical axis X. Therefore, the chromatic aberration, the astigmatism, the field curvature and the distortion can be properly corrected.

Furthermore, the object-side surface and the image-side surface of the sixth lens L6 are formed as the aspheric surfaces having at least one pole point in a position off the optical axis X. Therefore, the field curvature and the distortion can be properly corrected, and a light ray incident angle to an image sensor can be appropriately controlled.

Regarding the imaging lens according to the present embodiments, it is preferable that all lenses of the first lens L1 to the sixth lens L6 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with the case in which a cemented lens is used, workload is reduced, and manufacturing in low cost becomes possible.

Furthermore, the imaging lens according to the present embodiments makes manufacturing facilitated by using plastic material for all of the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the below conditional expressions (1) to (18).

$$5.00<(D1/f1)\times100<10.00 \tag{1}$$

$$2.20<(T2/TTL)\times100<4.70 \tag{2}$$

$$2.50<(T5/TTL)\times100<4.70 \tag{3}$$

$$0.15<vd5/vd6<0.55 \tag{4}$$

$$7.80<(D3/f3)\times100<14.00 \tag{5}$$

$$-1.15<r8/r11<-0.70 \tag{6}$$

$$5.00<(D4/f4)\times100<19.00 \tag{7}$$

$$2.50<(T1/TTL)\times100<6.50 \tag{8}$$

$$0.20<T2/T3<0.45 \tag{9}$$

$$0.80<f3/f4<1.65 \tag{10}$$

$$1.70<|r2|/f \tag{11}$$

$$1.20<r3/f<3.00 \tag{12}$$

$$0.20<r11/f<0.60 \tag{13}$$

$$3.00<f456/f<90.00 \tag{14}$$

$$4.00<(T3/TTL)\times100<16.50 \tag{15}$$

$$-0.90<r5/r6<-0.25 \tag{16}$$

$$-4.90<r6/f<-0.90 \tag{17}$$

$$TTL/EPd\leq3.10 \tag{18}$$

where
vd5: an abbe number at d-ray of the fifth lens L5,
vd6: an abbe number at d-ray of the sixth lens L6,
D1: a thickness along the optical axis X of the first lens L1,
D3: a thickness along the optical axis X of the third lens L3,
D4: a thickness along the optical axis X of the fourth lens L4,
T1: a distance along the optical axis X from an image-side surface of the first lens L1 to an object-side surface of the second lens L2,
T2: a distance along the optical axis X from an image-side surface of the second lens L2 to an object-side surface of the third lens L3,
T3: a distance along the optical axis X from an image-side surface of the third lens L3 to an object-side surface of the fourth lens L4,
T5: a distance along the optical axis X from an image-side surface of the fifth lens L5 to an object-side surface of the sixth lens L6,
TTL: a total track length,
EPd: an entrance pupil diameter,
f: a focal length of the overall optical system of the imaging lens,
f1: a focal length of the first lens L1,
f3: a focal length of the third lens L2,
f4: a focal length of the fourth lens L4,
f456: a composite focal length of the fourth lens L4, the fifth lens L5 and the sixth lens L6,
r2: paraxial curvature radius of an image-side surface of the first lens L1,
r3: paraxial curvature radius of an object-side surface of the second lens L2,
r5: paraxial curvature radius of an object-side surface of the third lens L3,
r6: paraxial curvature radius of an image-side surface of the third lens L3,
r8: paraxial curvature radius of an image-side surface of the fourth lens L4, and
r11: paraxial curvature radius of an object-side surface of the sixth lens L6.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (18a).

$$6.20 < (D1/f1) \times 100 < 9.70 \tag{1a}$$

$$2.60 < (T2/TTL) \times 100 < 4.10 \tag{2a}$$

$$3.00 < (T5/TTL) \times 100 < 4.40 \tag{3a}$$

$$0.25 < vd5/vd6 < 0.45 \tag{4a}$$

$$8.80 < (D3/f3) \times 100 < 12.00 \tag{5a}$$

$$-1.05 < r8/r11 < -0.80 \tag{6a}$$

$$7.50 < (D4/f4) \times 100 < 16.00 \tag{7a}$$

$$3.20 < (T1/TTL) \times 100 < 5.70 \tag{8a}$$

$$0.25 < T2/T3 < 0.40 \tag{9a}$$

$$0.95 < f3/f4 < 1.55 \tag{10a}$$

$$1.95 < |r2|/f < 100.00 \tag{11a}$$

$$1.35 < r3/f < 2.50 \tag{12a}$$

$$0.35 < r11/f < 0.50 \tag{13a}$$

$$5.00 < f456/f < 70.00 \tag{14a}$$

$$6.50 < (T3/TTL) \times 100 < 13.50 \tag{15a}$$

$$-0.80 < r5/r6 < -0.30 \tag{16a}$$

$$-4.00 < r6/f < -1.40 \tag{17a}$$

$$TTL/EPd \leq 2.90 \tag{18a}$$

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes paraxial curvature radius, k denotes a conic constant, and A4, A6, A8, A10, A12, A14, A16, A18 and A20 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{20} \qquad \text{Equation 1}$$

Next, examples of the imaging lens according to this embodiment will be explained. In each example, f denotes the focal length of the overall optical system of the imaging lens, Fno denotes a F-number, ω denotes a half field of view, ih denotes a maximum image height, and TTL denotes a total track length. Additionally, i denotes surface number counted from the object side, r denotes the paraxial curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

Example1
Unit mm
f = 3.08
ih = 2.93
Fno = 1.90
TTL = 4.29
ω(°) = 45.1

Surface Data

| Surface Number i | Curvature Radius r | Surface Distance d | Refractive Index Nd | Abbe Number vd |
|---|---|---|---|---|
| (Object) | Infinity | Infinity | | |
| 1(Stop) | Infinity | −0.1064 | | |
| 2* | 2.1272 | 0.4128 | 1.544 | 55.86 (vd1) |
| 3* | 6.6198 | 0.1970 | | |
| 4* | 5.1113 | 0.2050 | 1.651 | 20.37 (vd2) |
| 5* | 2.4976 | 0.1420 | | |
| 6* | 3.6250 | 0.4929 | 1.535 | 55.66 (vd3) |
| 7* | −8.4378 | 0.3797 | | |
| 8* | −2.7967 | 0.4634 | 1.535 | 55.66 (vd4) |
| 9* | −1.1916 | 0.0350 | | |
| 10* | Infinity | 0.3153 | 1.651 | 20.37 (vd5) |
| 11* | Infinity | 0.1702 | | |
| 12* | 1.3979 | 0.3555 | 1.535 | 55.60 (vd6) |
| 13* | 0.7072 | 0.5000 | | |
| 14 | Infinity | 0.1100 | 1.517 | 64.20 |
| 15 | Infinity | 0.5442 | | |
| Image Plane | Infinity | | | |

TABLE 1-continued

Example1
Unit mm
f = 3.08
ih = 2.93
Fno = 1.90
TTL = 4.29
ω(°) = 45.1

Constituent Lens Data

| Lens | Start Surface | Focal Length | Composite Focal Length | | Entrance pupil diameter | |
|---|---|---|---|---|---|---|
| 1 | 2 | 5.578 | f456 | 23.167 | EPd | 1.620 |
| 2 | 4 | −7.630 | | | | |
| 3 | 6 | 4.810 | | | | |
| 4 | 8 | 3.527 | | | | |
| 5 | 10 | Infinity | | | | |
| 6 | 12 | −3.261 | | | | |

Aspheric Surface Data

| | Second Surface | Third Surface | Fourth Surface | Fifth Surface | Sixth Surface | Seventh Surface |
|---|---|---|---|---|---|---|
| k | −2.562894E+00 | 0.000000E+00 | 7.494871E−01 | −3.338218E+00 | −2.093850E−01 | 0.000000E+00 |
| A4 | −1.065162E−02 | −1.942266E−01 | −4.046073E−01 | −4.019359E−01 | −2.533331E−01 | −9.166144E−02 |
| A6 | 7.128990E−01 | 1.030876E+00 | 6.066460E−01 | 6.589434E−01 | 6.029536E−01 | −2.201389E−01 |
| A8 | −9.281330E+00 | −7.211721E+00 | −1.546917E+00 | −6.278581E−01 | −2.872675E+00 | 2.005389E+00 |
| A10 | 6.184279E+01 | 3.218123E+01 | 6.131257E+00 | −7.393476E−01 | 5.687853E+00 | −8.246681E+00 |
| A12 | −2.391505E+02 | −9.243100E+01 | −2.318404E+01 | 4.179154E+00 | −4.218760E+00 | 1.186169E+01 |
| A14 | 5.567191E+02 | 1.876546E+02 | 5.469264E+01 | −9.443783E+00 | −4.582730E+00 | −2.343956E−01 |
| A16 | −7.705640E+02 | −1.864530E+02 | −7.719705E+01 | 1.217620E+01 | 1.118712E+01 | 1.766160E+01 |
| A18 | 5.647130E+02 | 1.164196E+02 | 6.090753E+01 | −8.275240E+00 | −7.846053E+00 | −7.199037E+00 |
| A20 | −1.873810E+02 | −3.155062E+01 | −2.107985E+01 | 2.277558E+00 | 1.940000E+00 | 1.230000E+00 |

| | Eight Surface | Ninth Surface | Tenth Surface | Eleventh Surface | Twelfth Surface | Thirteenth Surface |
|---|---|---|---|---|---|---|
| k | 4.150000E+00 | −1.132047E+00 | 0.000000E+00 | 0.000000E+00 | −6.256975E−01 | −3.738317E+00 |
| A4 | −2.539604E−01 | −2.726678E−01 | 4.026586E−01 | 8.445589E−01 | −3.380253E−01 | −1.823657E−01 |
| A6 | 2.992022E−01 | 1.255400E+00 | −2.331309E−01 | −1.709829E+00 | −1.865617E−02 | 3.990371E−02 |
| A8 | 1.812286E+00 | −2.870082E+00 | −1.036524E+00 | 1.731807E+00 | 1.815927E−02 | 4.438701E−02 |
| A10 | −8.195168E+00 | 3.977957E+00 | 2.178280E+00 | −1.089658E+00 | 8.553124E−02 | −4.39764E−02 |
| A12 | 1.537464E+01 | −3.776224E+00 | −2.052110E+00 | 4.445140E−01 | −7.747324E−02 | 1.905327E−02 |
| A14 | −1.595570E+01 | 2.585806E+00 | 1.104081E+00 | −1.168013E−01 | 2.945275E−02 | −4.786205E−03 |
| A16 | 9.516552E+00 | −1.178850E+00 | −3.501522E−01 | 1.878556E−02 | −5.889314E−03 | 7.163625E−04 |
| A18 | −3.164510E+00 | 3.041706E−01 | 6.121204E−02 | −1.636684E−03 | 5.119376E−04 | −5.946209E−05 |
| A20 | 4.404827E−01 | −3.304377E−02 | −4.559872E−03 | 5.623803E−05 | −2.623909E−05 | 2.113942E−06 |

The imaging lens in Example 1 satisfies conditional expressions (1) to (18) as shown in Table 7.

Figure 2:
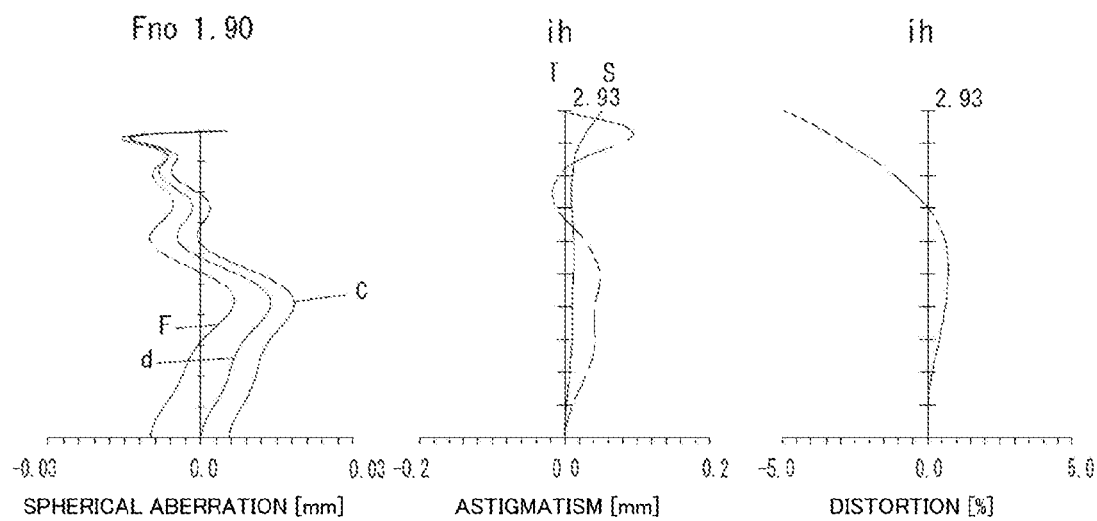
FIG. 2 shows spherical aberration, astigmatism, and distortion of the imaging lens in Example 1 according to the present invention.
Figure 3:
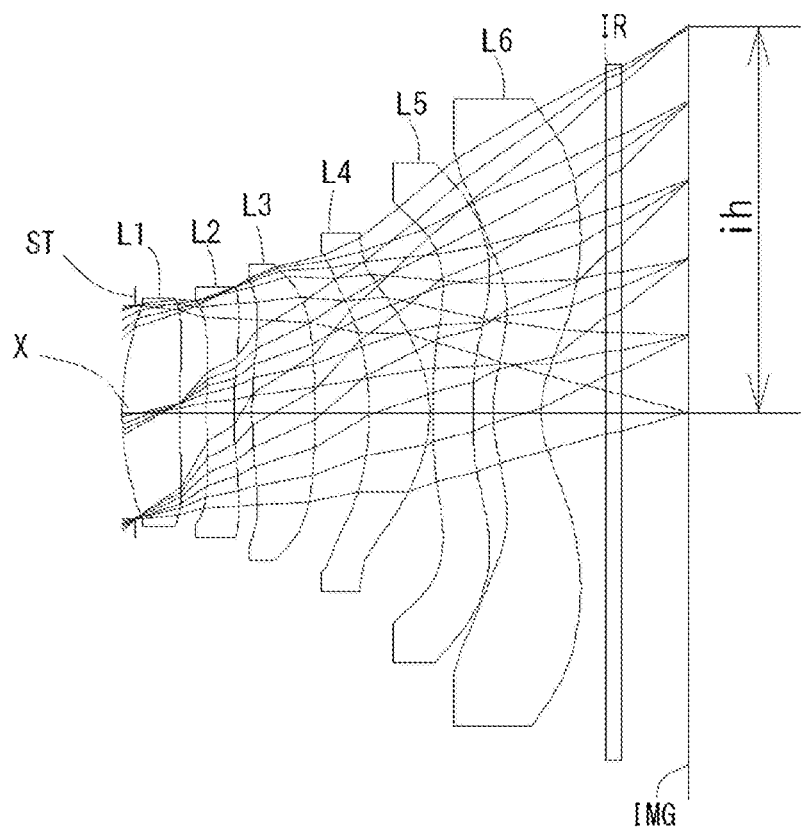
FIG. 3 is a schematic view showing an imaging lens in Example 2 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6, 8, 10 and 12). As shown in FIG. 2, each aberration is corrected excellently.

Example 2

The basic lens data is shown below in Table 2.

TABLE 2

Example2
Unit mm
f = 3.06
ih = 2.93
Fno = 1.90
TTL = 4.26
ω(°) = 43.8

Surface Data

| Surface Number i | Curvature Radius r | Surface Distance d | Refractive Index Nd | Abbe Number vd |
|---|---|---|---|---|
| (Object) | Infinity | Infinity | | |
| 1(Stop) | Infinity | −0.1050 | | |
| 2* | 2.0833 | 0.4373 | 1.544 | 55.86 (vd1) |
| 3* | 7.2579 | 0.2052 | | |
| 4* | 5.0757 | 0.2026 | 1.661 | 20.37 (vd2) |

TABLE 2-continued

Example2
Unit mm
f = 3.06
ih = 2.93
Fno = 1.90
TTL = 4.26
ω(°) = 43.8

| | | | | |
|---|---|---|---|---|
| 5* | 2.3903 | 0.1429 | | |
| 6* | 3.4797 | 0.4761 | 1.535 | 55.66 (vd3) |
| 7* | −9.8730 | 0.4114 | | |
| 8* | −2.7874 | 0.4578 | 1.535 | 55.66 (vd4) |
| 9* | −1.1789 | 0.0327 | | |
| 10* | Infinity | 0.3053 | 1.661 | 20.37 (vd5) |
| 11* | Infinity | 0.1500 | | |
| 12* | 1.3638 | 0.3587 | 1.535 | 55.66 (vd6) |
| 13* | 0.7042 | 0.5000 | | |
| 14 | Infinity | 0.1100 | 1.617 | 64.20 |
| 15 | Infinity | 0.5124 | | |
| Image Plane | Infinity | | | |

Constituent Lens Data

| Lens | Start Surface | Focal Length | Composite Focal Length | | Entrance pupil diameter | |
|---|---|---|---|---|---|---|
| 1 | 2 | 5.213 | f456 | 20.351 | EPd | 1.611 |
| 2 | 4 | −7.049 | | | | |
| 3 | 6 | 4.871 | | | | |
| 4 | 8 | 3.475 | | | | |
| 5 | 10 | Infinity | | | | |
| 8 | 12 | −3.285 | | | | |

Aspheric Surface Data

| | Second Surface | Third Surface | Fourth Surface | Fifth Surface | Sixth Surface | Seventh Surface |
|---|---|---|---|---|---|---|
| k | −2.360112E+00 | 0.000000E+00 | 3.178645E−01 | −3.439155E+00 | −6.438314E−01 | 0.000000E+00 |
| A4 | −8.868830E−03 | −1.932386E−01 | −4.049923E−01 | −4.024015E−01 | −2.546218E−01 | −9.240884E−02 |
| A6 | 7.114689E−01 | 1.034073E+00 | 6.032665E−01 | 6.594259E−01 | 8.010714E−01 | −2.197909E−01 |
| A8 | −9.280046E+00 | −7.211921E+00 | −1.544835E+00 | −6.281904E−01 | −2.872221E+00 | 2.004978E+00 |
| A10 | 6.184733E+01 | 3.218557E+01 | 6.139947E+00 | −7.372985E−01 | 5.688380E+00 | −8.246968E+00 |
| A12 | −2.391505E+02 | −9.243100E+01 | −2.318404E+01 | 4.179154E+00 | −4.218760E+00 | 1.816167E+01 |
| A14 | 5.567191E+02 | 1.676546E+02 | 5.469264E+01 | −9.443783E+00 | −4.582730E+00 | −2.343956E+01 |
| A16 | −7.706640E+02 | −1.864530E+02 | −7.719705E+01 | 1.217620E+01 | 1.118712E+01 | 1.766160E+01 |
| A18 | 5.847130E+02 | 1.164196E+02 | 6.090753E+01 | −8.275240E+00 | −7.846053E+00 | −7.199037E+00 |
| A20 | −1.873810E+02 | −3.155062E+01 | −2.107985E+01 | 2.277558E+00 | 1.936860E+00 | 1.230448E+00 |

| | Eighth Surface | Ninth Surface | Tenth Surface | Eleventh Surface | Twelfth Surface | Thirteenth Surface |
|---|---|---|---|---|---|---|
| k | 4.150000E+00 | −1.141638E+00 | 0.000000E+00 | 0.000000E+00 | −6.226082E−01 | −3.703984E+00 |
| A4 | −2.530423E−01 | −2.720354E−01 | 4.020827E−01 | 8.414581E−01 | −3.398405E−01 | −1.804770E−01 |
| A6 | 2.988708E−01 | 1.255732E+00 | −2.322801E−01 | −1.710434E+00 | −1.930614E−02 | 3.990088E−02 |
| A8 | 1.812122E+00 | −2.870055E+00 | −1.036581E+00 | 1.731843E+00 | 1.803382E−02 | 4.432104E−02 |
| A10 | −8.195131E+00 | 3.977982E+00 | 2.178238E+00 | −1.089645E+00 | 8.550935E−02 | −4.397914E−02 |
| A12 | 1.537494E+01 | −3.776199E+00 | −2.052127E+00 | 4.445158E−01 | −7.747342E−02 | 1.905348E−02 |
| A14 | −1.595570E+01 | 2.585908E+00 | 1.104073E+00 | −1.168013E−01 | 2.945421E−02 | −4.785959E−03 |
| A16 | 9.615552E+00 | −1.176843E+00 | −3.501518E−01 | 1.878252E−02 | −5.588575E−03 | 7.163987E−04 |
| A18 | −3.164510E+00 | 3.041706E−01 | 6.121249E−02 | −1.636760E−03 | 6.122598E−04 | −5.945931E−05 |
| A20 | 4.404827E−01 | −3.304377E−02 | −4.559457E−03 | 5.620585E−05 | −2.634533E−05 | 2.114185E−06 |

The imaging lens in Example 2 satisfies conditional expressions (1) to (18) as shown in Table 7.

Figure 4:
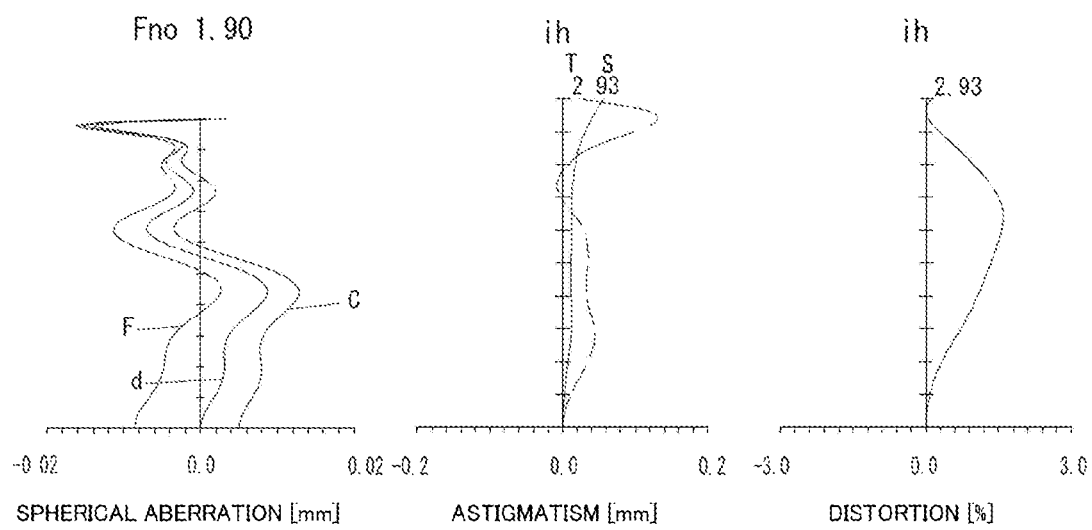
FIG. 4 shows spherical aberration, astigmatism, and distortion of the imaging lens in Example 2 according to the present invention.
Figure 5:
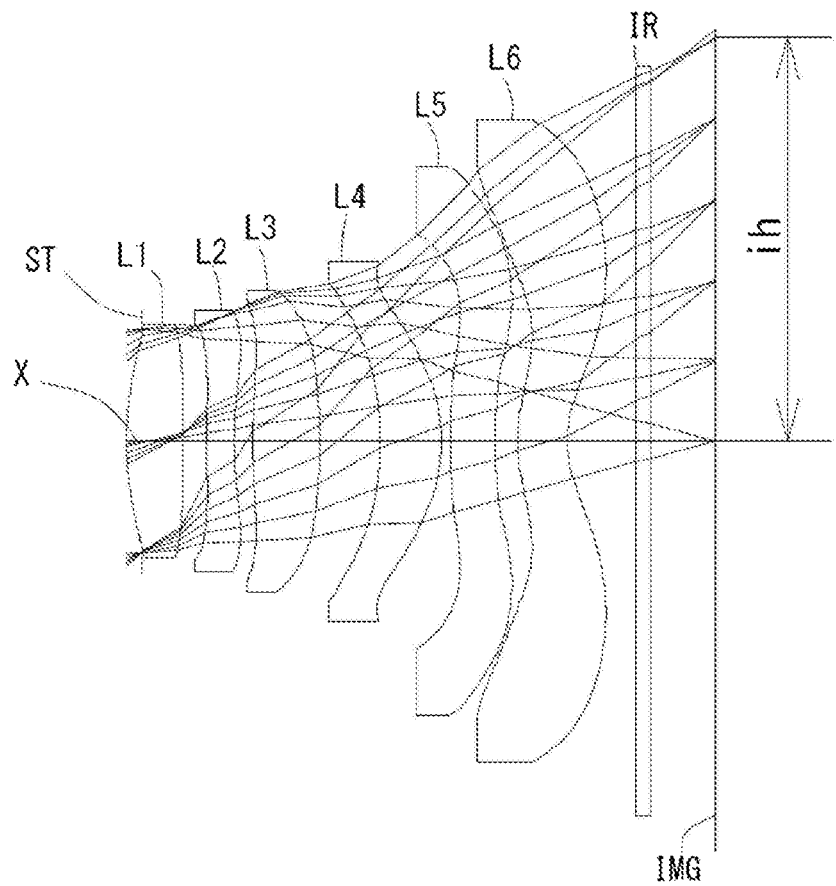
FIG. 5 is a schematic view showing an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example3
Unit mm
f = 3.09
ih = 2.93
Fno = 1.90
TTL = 4.26
ω(°) = 43.0

Surface Data

| Surface Number i | Curvature Radius r | Surface Distance d | Refractive Index Nd | Abbe Number vd |
|---|---|---|---|---|
| (Object) | Infinity | Infinity | | |
| 1(Stop) | Infinity | −0.1050 | | |
| 2* | 2.4327 | 0.4100 | 1.544 | 35.86 (vd1) |
| 3* | −200.0000 | 0.1754 | | |
| 4* | 6.1068 | 0.2000 | 1.661 | 20.37 (vd2) |
| 5* | 2.3337 | 0.1350 | | |
| 6* | 4.0324 | 0.4868 | 1.535 | 55.66 (vd3) |
| 7* | −6.5508 | 0.4437 | | |
| 8* | −2.7360 | 0.4460 | 1.535 | 55.66 (vd4) |
| 9* | −1.2908 | 0.0717 | | |
| 10* | Infinity | 0.3238 | 1.661 | 20.37 (vd5) |
| 11* | Infinity | 0.1830 | | |
| 12* | 1.3637 | 0.3578 | 1.535 | 55.66 (vd6) |
| 13* | 0.7173 | 0.5000 | | |
| 14 | Infinity | 0.1100 | 1.517 | 64.20 |
| 15 | Infinity | 0.4735 | | |
| Image Plane | Infinity | | | |

Constituent Lens Data

| Lens | Start Surface | Focal Length | Composite Focal length | | Entrance pupil diameter | |
|---|---|---|---|---|---|---|
| 1 | 2 | 4.419 | f456 | 78.561 | EPd | 1.629 |
| 2 | 4 | −5.840 | | | | |
| 3 | 6 | 4.743 | | | | |
| 4 | 8 | 4.128 | | | | |
| 5 | 10 | Infinity | | | | |
| 6 | 12 | −3.505 | | | | |

Aspheric Surface Data

| | Second Surface | Third Surface | Fourth Surface | Fifth Surface | Sixth Surface | Seventh Surface |
|---|---|---|---|---|---|---|
| k | −3.107997E+00 | 0.000000E+00 | 2.525062E+01 | −3.570877E+00 | −7.141730E−01 | 0.000000E+00 |
| A4 | −1.465740E−02 | −1.677858E−01 | −3.917860E−01 | −4.051554E−01 | −2.574739E−01 | −1.046782E−01 |
| A6 | 6.977768E−01 | 1.047396E+00 | 6.153461E−01 | 6.469790E−01 | 7.968953E−01 | −2.077288E−01 |
| A8 | −9.287253E+00 | −7.231164E+00 | −1.544119E+00 | −6.430089E−01 | −2.871108E+00 | 2.010610E+00 |
| A10 | 6.185884E+01 | 3.222144E+01 | 6.110288E+00 | −7.465991E−01 | 5.698822E+00 | −8.249163E+00 |
| A12 | −2.391415E+02 | −9.2423201E+01 | −2.318377E+01 | 4.181717E+00 | −4.215854E+00 | 1.816175E+01 |
| A14 | 5.567198E+02 | 1.676545E+02 | 5.469287E+01 | −9.442703E+00 | −4.581766E+00 | −2.343985E+01 |
| A16 | −7.708640E+02 | −1.864530E+02 | −7.719703E+01 | 1.217606E+01 | 1.116635E+01 | 1.766212E+01 |
| A18 | 5.347130E+02 | 1.164196E+02 | 6.090753E+01 | −8.275259E+00 | −7.847413E+00 | −7.199312E+00 |
| A20 | −1.873710E+02 | −3.155062E+01 | −2.107985E+01 | 2.277556E+00 | 1.935243E+00 | 1.230151E+00 |

| | Eighth Surface | Ninth Surface | Tenth Surface | Eleventh Surface | Twelfth Surface | Thirteenth Surface |
|---|---|---|---|---|---|---|
| k | 4.100000E+00 | −1.044315E+00 | 0.000000E+00 | 0.000000E+00 | −5.266048E−01 | −3.760508E+00 |
| A4 | −2.599743E−01 | −2.763625E−01 | 3.951008E−01 | 8.445863E−01 | −3.452192E−01 | −1.829935E−01 |
| A6 | 2.897753E−01 | 1.259006E+00 | −2.315288E−01 | −1.714752E+00 | −1.775995E−02 | 3.906143E−02 |
| A8 | 1.808961E+00 | −2.871011E+00 | −1.038227E+00 | 1.733932E+00 | 1.812670E−02 | 4.432938E−02 |
| A10 | −8.190367E+00 | 3.977362E+00 | 2.177174E+00 | −1.089583E+00 | 8.544185E−02 | −4.392315E−02 |
| A12 | 1.537661E+01 | −3.775365E+00 | −2.051160E+00 | 4.444786E−01 | −7.747139E−02 | 1.905692E−02 |
| A14 | −1.595604E+01 | 2.588115E+00 | 1.104304E+00 | −1.168109E−01 | 2.945395E−02 | −4.786924E−03 |
| A16 | 9.615236E+00 | −1.176786E+00 | −3.500879E−01 | 1.878606E−02 | −5.88692E−03 | 7.161689E−04 |

TABLE 3-continued

Example3
Unit mm
f = 3.09
ih = 2.93
Fno = 1.90
TTL = 4.26
ω(°) = 43.0

| | | | | | | |
|---|---|---|---|---|---|---|
| A18 | −3.165005E+00 | 3.041947E−01 | 6.119671E−02 | −1.636476E−03 | 8.122518E−04 | −5.948413E−05 |
| A20 | 4.403195E−01 | −3.304744E−02 | −4.592539E−03 | 5.507899E−05 | −2.635155E−05 | 2.117566E−06 |

The imaging lens in Example 3 satisfies conditional expressions (1) to (18) as shown in Table 7.

Figure 6:
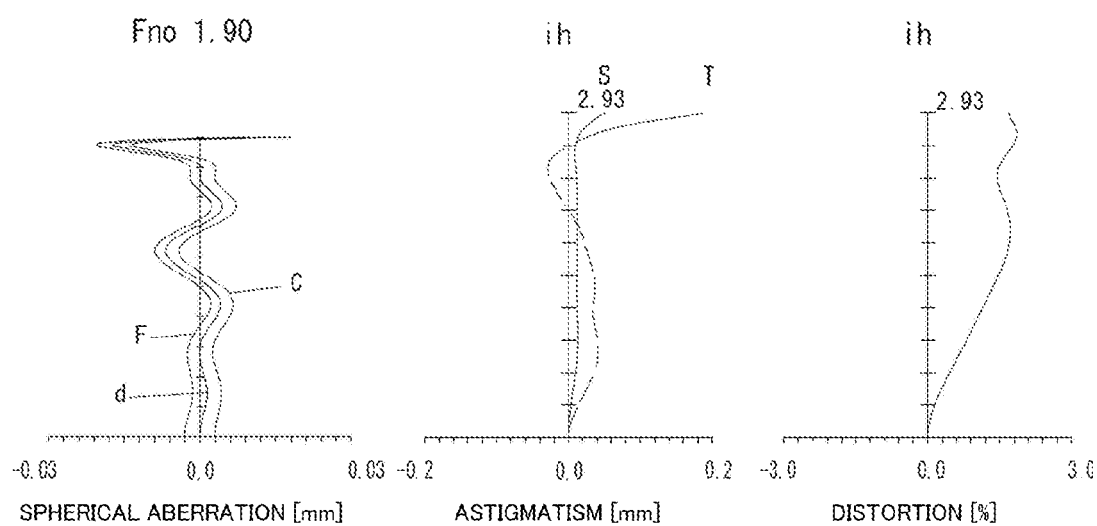
FIG. 6 shows spherical aberration, astigmatism, and distortion of the imaging lens in Example 3 according to the present invention.
Figure 7:
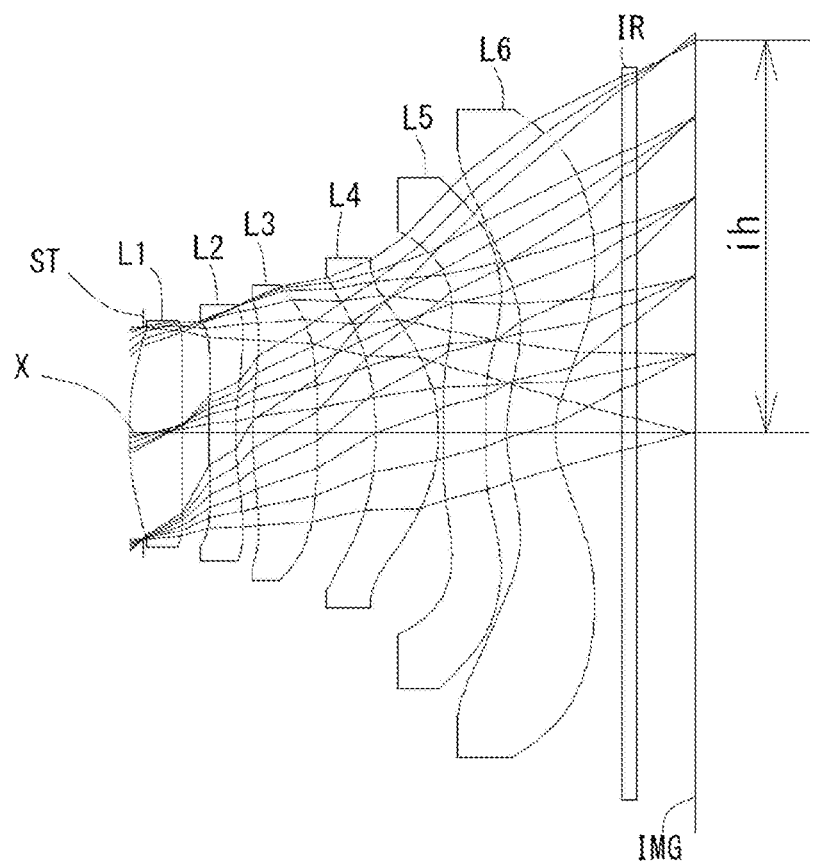
FIG. 7 is a schematic view showing an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example4
Unit mm
f = 2.99
ih = 2.93
Fno = 1.90
TTL = 4.18
ω(°) = 44.0

Surface Data

| Surface Number i | Curvature Radius r | Surface Distance d | Refractive Index Nd | Abbe Number νd |
|---|---|---|---|---|
| (Object) | Infinity | Infinity | | |
| 1(Stop) | Infinity | −0.1050 | | |
| 2* | 2.2104 | 0.4000 | 1.544 | 55.86 (vd1) |
| 3* | 11.3635 | 0.1943 | | |
| 4* | 4.5002 | 0.2009 | 1.661 | 20.37 (vd2) |
| 5* | 2.1687 | 0.1300 | | |
| 6* | 3.1875 | 0.4308 | 1.535 | 55.66 (vd3) |
| 7* | −9.2262 | 0.4316 | | |
| 8* | −2.7249 | 0.4593 | 1.535 | 55.66 (vd4) |
| 9* | −1.2225 | 0.0354 | | |
| 10* | Infinity | 0.3121 | 1.661 | 20.37 (vd5) |
| 11* | Infinity | 0.1600 | | |
| 12* | 1.3595 | 0.3619 | 1.535 | 55.66 (vd6) |
| 13* | 0.6999 | 0.5000 | | |
| 14 | Infinity | 0.1100 | 1.517 | 64.20 |
| 15 | Infinity | 0.4312 | | |
| Image Plane | Infinity | | | |

Constituent Lens Data

| Lens | Start Surface | Focal Length | Composite Focal Length | | Entrance pupil diameter | |
|---|---|---|---|---|---|---|
| 1 | 2 | 4.965 | f456 | 35.112 | EPd | 1.576 |
| 2 | 4 | −6.560 | | | | |
| 3 | 6 | 4.490 | | | | |
| 4 | 8 | 3.739 | | | | |
| 5 | 10 | Infinity | | | | |
| 6 | 12 | −3.334 | | | | |

Aspheric Surface Data

| | Second Surface | Third Surface | Fourth Surface | Fifth Surface | Sixth Surface | Seventh Surface |
|---|---|---|---|---|---|---|
| k | −2.528094E+00 | 0.000000E+00 | 1.315685E+01 | −2.697304E+00 | −1.078700E+00 | 0.000000E+00 |
| A4 | −1.168424E−02 | −1.833528E−01 | −4.023424E−01 | −4.003880E−01 | −2.575483E−01 | −1.060725E−01 |
| A6 | 6.982384E−01 | 1.041457E+00 | 5.985202E−01 | 6.509626E−01 | 7.999937E−01 | −2.138689E−01 |
| A8 | −9.282802E+00 | −7.239927E+00 | −1.549772E+00 | −6.421415E−01 | −2.872305E+00 | 2.007352E+00 |
| A10 | 6.184214E+01 | 3.221281E+01 | 6.116873E+00 | −7.472455E−01 | 5.692295E+00 | −8.248214E+00 |
| A12 | −2.391415E+10 | −9.243200E+01 | −2.318494E+01 | 4.180972E+00 | −4.218565E+00 | 1.816218E+01 |
| A14 | 5.567198E+02 | 1.678545E+02 | 5.469287E+01 | −9.444499E+00 | −4.582677E+00 | −2.343931E+01 |
| A16 | −7.706640E+02 | −1.864530E+02 | −7.719703E+01 | 1.217606E+01 | 1.118685E+01 | 1.766264E+01 |

TABLE 4-continued

Example4
Unit mm
f = 2.99
ih = 2.93
Fno = 1.90
TTL = 4.18
ω(°) = 44.0

| | | | | | | |
|---|---|---|---|---|---|---|
| A18 | 5.847130E+02 | 1.164196E+02 | 6.080753E+01 | −8.275258E+00 | −7.845039E+00 | −7.198784E+00 |
| A20 | −1.873810E+02 | −3.155062E+01 | −2.107985E+01 | 2.277556E+00 | 1.936860E+00 | 1.230365E+00 |

| | Eighth Surface | Ninth Surface | Tenth Surface | Eleventh Surface | Twelfth Surface | Thirteenth Surface |
|---|---|---|---|---|---|---|
| k | 4.080000E+00 | −1.064310E+00 | 0.000000E+00 | 0.000000E+00 | −6.239098E−01 | −3.855123E+00 |
| A4 | −2.596259E−01 | −2.751622E−01 | 3.967368E−01 | 8.457166E−01 | −3.479900E−01 | −1.835106E−01 |
| A6 | 2.903350E−01 | 1.259377E+00 | −2.332408E−01 | −1.717026E+00 | −1.806435E−02 | 3.958234E−02 |
| A8 | 1.810705E+00 | −2.871753E+00 | −1.038784E+00 | 1.733488E+00 | 1.809444E−02 | 4.424334E−02 |
| A10 | −8.187243E+00 | 3.976825E+00 | 2.176751E+00 | −1.089482E+00 | 8.544223E−02 | −4.393867E−02 |
| A12 | 1.537683E+01 | −3.775714E+00 | −2.051520E+00 | 4.444620E−01 | −7.747195E−02 | 1.905788E−02 |
| A14 | −1.595592E+01 | 2.586066E+00 | 1.104204E+00 | −1.168122E−01 | 2.945409E−02 | −4.786928E−03 |
| A16 | 9.515256E+00 | −1.176785E+00 | −3.501002E−01 | 1.878582E−02 | −5.885675E−03 | 7.162473E−04 |
| A18 | −3.16499E+00 | 3.041989E−01 | 6.120040E−02 | −1.636365E−03 | 5.122600E−04 | −5.948701E−05 |
| A20 | 4.403146E−01 | −3.303852E−02 | −4.586348E−03 | 5.616626E−05 | −2.634834E−05 | 2.118420E−06 |

The imaging lens in Example 4 satisfies conditional expressions (1) to (18) as shown in Table 7.

Figure 8:
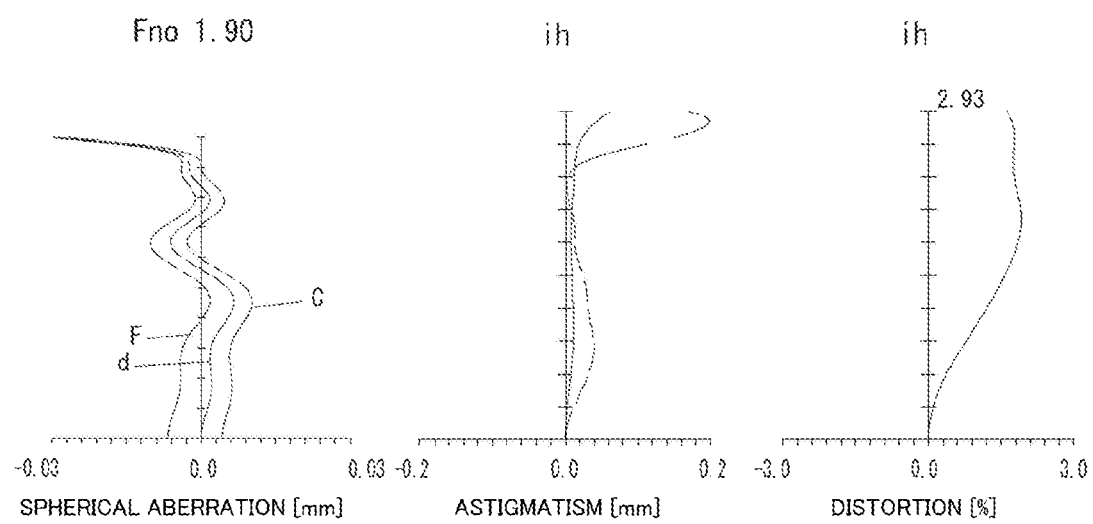
FIG. 8 shows spherical aberration, astigmatism, and distortion of the imaging lens in Example 4 according to the present invention.
Figure 9:
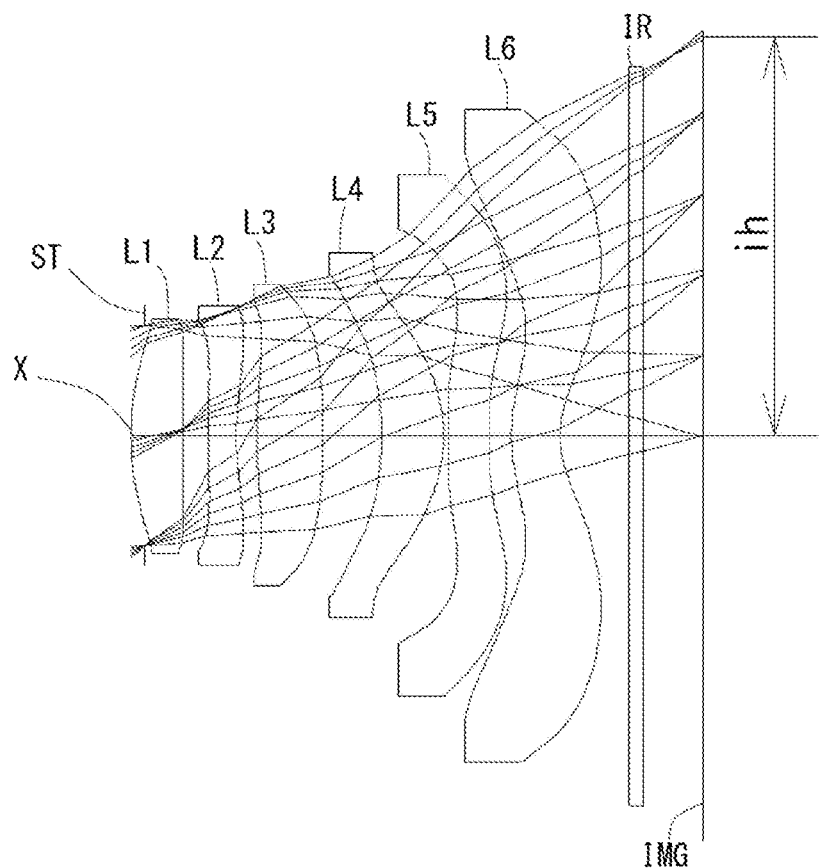
FIG. 9 is a schematic view showing an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example5
Unit mm
f = 3.00
ih = 2.93
Fno = 1.85
TTL = 4.16
ω(°) = 44.1

| Surface Data | | | | |
|---|---|---|---|---|
| Surface Number i | Curvature Radius r | Surface Distance d | Refractive Index Nd | Abbe Number vd |
| (Object) | Infinity | Infinity | | |
| 1(Stop) | Infinity | −0.1050 | | |
| 2* | 2.0935 | 0.3800 | 1.544 | 55.86 (vd1) |
| 3* | 8.6088 | 0.1836 | | |
| 4* | 4.5286 | 0.2109 | 1.661 | 20.37 (vd2) |
| 5* | 2.2267 | 0.1500 | | |
| 6* | 3.5274 | 0.4829 | 1.535 | 55.66 (vd3) |
| 7* | −7.5527 | 0.4326 | | |
| 8* | −2.7122 | 0.4554 | 1.535 | 55.66 (vd4) |
| 9* | −1.2173 | 0.0359 | | |
| 10* | Infinity | 0.3038 | 1.661 | 20.37 (vd5) |
| 11* | Infinity | 0.1600 | | |
| 12* | 1.3583 | 0.3578 | 1.535 | 55.66 (vd6) |
| 13* | 0.6955 | 0.5000 | | |
| 14 | Infinity | 0.1100 | 1.517 | 64.20 |
| 15 | Infinity | 0.4372 | | |
| Image plane | Infinity | | | |

| Constituent Lens Data | | | | | |
|---|---|---|---|---|---|
| Lens | Start Surface | Focal Length | Composite Focal Length | | Entrance pupil diameter |
| 1 | 2 | 4.980 | f456 | 41.151 | EPd 1.619 |
| 2 | 4 | −6.881 | | | |
| 3 | 6 | 4.565 | | | |
| 4 | 8 | 3.734 | | | |
| 5 | 10 | Infinity | | | |
| 8 | 12 | −3.282 | | | |

TABLE 5-continued

Example5
Unit mm
f = 3.00
ih = 2.93
Fno = 1.85
TTL = 4.16
ω(°) = 44.1

Aspheric Surface Data

|     | Second Surface | Third Surface | Fourth Surface | Fifth Surface | Sixth Surface | Seventh Surface |
| --- | --- | --- | --- | --- | --- | --- |
| k   | −1.979404E+00 | 0.000000E+00 | 1.091585E+01 | −2.651075E+00 | −4.838070E−01 | 0.000000E+00 |
| A4  | −5.854410E−03 | −1.796462E−01 | −4.061944E−01 | 4.000112E−01 | −2.568905E−01 | −1.074807E−01 |
| A6  | 7.041031E−01 | 1.052594E+00 | 5.923937E−01 | 6.501063E−01 | 8.027922E−01 | −2.139931E−01 |
| A8  | −9.268425E+00 | −7.244263E+00 | −1.546149E+00 | −6.431333E−01 | −2.872228E+00 | 2.006326E+00 |
| A10 | 5.182637E+01 | 3.219420E+01 | 6.118029E+00 | −7.427964E−01 | 5.585260E+00 | −8.245776E+00 |
| A12 | −2.391415E+02 | −9.243201E+01 | −7.318492E+01 | 4.182863E+00 | −4.218014E+00 | 1.816182E+01 |
| A14 | 5.567198E+02 | 1.676564E+02 | 5.469287E+01 | −9.441826E+00 | −4.582205E+00 | −2.343957E+01 |
| A16 | −7.706640E+02 | −1.864530E+02 | −7.719703E+01 | 1.217606E+01 | 1.118749E+01 | 1.766237E+01 |
| A18 | 5.847130E+02 | 1.164196E+02 | 6.080753E+01 | −8.275259E+00 | −7.646038E+00 | −7.199067E+00 |
| A20 | −1.873810E+02 | −3.155082E+01 | −2.107985E+01 | 2.277556E+00 | 1.936860E+00 | 1.230365E+00 |

|     | Eighth Surface | Ninth Surface | Tenth Surface | Eleventh Surface | Twelfth Surface | Thirteenth Surface |
| --- | --- | --- | --- | --- | --- | --- |
| k   | 4.030000E+00 | −1.062807E+00 | 0.000000E+00 | 0.000000E+00 | −6.252209E−01 | −3.610871E+00 |
| A4  | −2.565807E−01 | −2.750994E−01 | 3.945538E−01 | 8.483443E−01 | −3.458413E−01 | −1.857834E−01 |
| A6  | 2.828688E−01 | 1.261258E+00 | −2.308112E−01 | −1.717438E+00 | −1.812907E−02 | 4.039365E−02 |
| A8  | 1.810110E+00 | −2.872789E+00 | −1.038153E+00 | 1.733578E+00 | 1.807888E−02 | 4.418046E−02 |
| A10 | −8.184849E+00 | 3.976187E+00 | 2.176191E−00 | −1.089509E+00 | 8.543625E−02 | −4.394824E−02 |
| A12 | 1.537672E+01 | −3.775849E+00 | −2.051465E+00 | 4.444576E−01 | −7.747467E−02 | 1.905689E−02 |
| A14 | −1.595596E+01 | 2.586089E+00 | 1.104212E+00 | −1.108118E−01 | 2.945395E−02 | −4.786902E−03 |
| A16 | 9.615879E+00 | −1.176792E+00 | −3.501003E−01 | 1.878614E−02 | −5.588644E−03 | 7.162721E−04 |
| A18 | −3.164968E+00 | 3.042025E−01 | 6.120080E−02 | −1.636314E−03 | 6.122731E−04 | −5.948360E−05 |
| A20 | 4.403148E−01 | −3.304213E−02 | −4.584528E−03 | 5.614478E−05 | −2.634494E−05 | 2.119159E−06 |

The imaging lens in Example 5 satisfies conditional expressions (1) to (18) as shown in Table 7.

Figure 10:
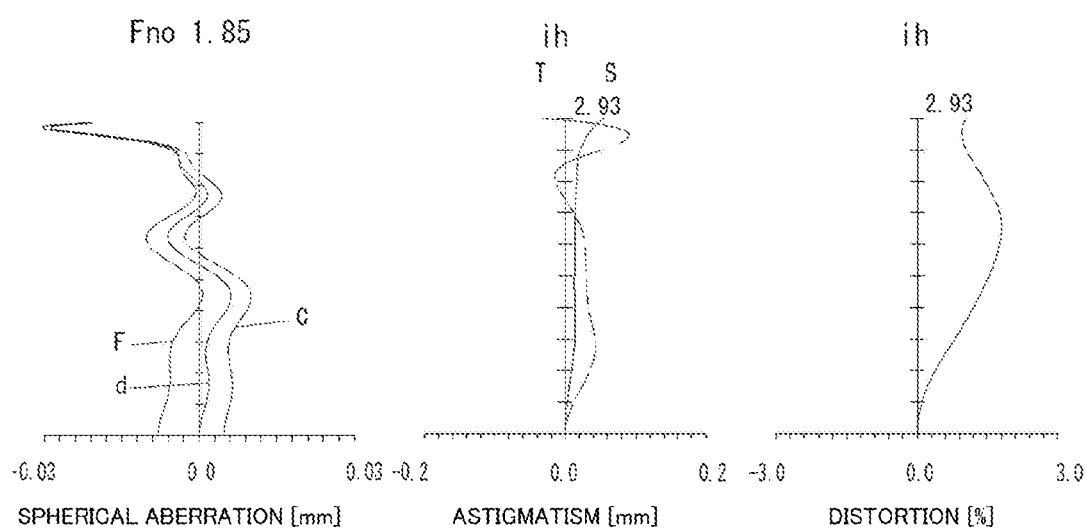
FIG. 10 shows spherical aberration, astigmatism, and distortion of the imaging lens in Example 5 according to the present invention.
Figure 11:
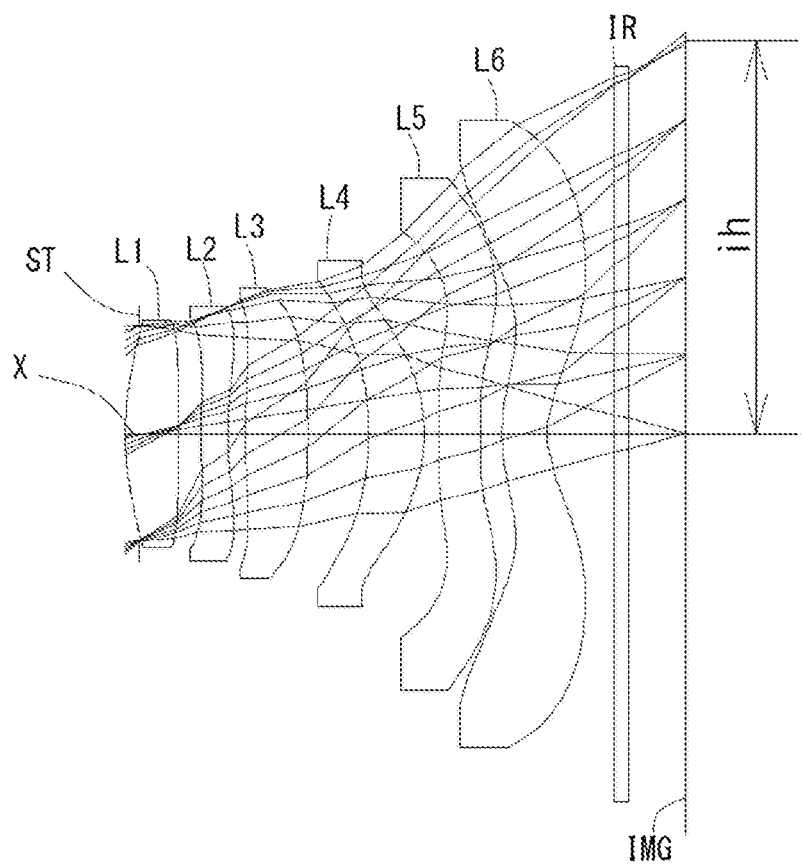
FIG. 11 is a schematic view showing an imaging lens in Example 6 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

Example6
Unit mm
f = 3.04
ih = 2.93
Fno = 1.90
TTL = 4.16
ω(°) = 43.5

Surface Data

| Surface Number i | Curvature Radius r | Surface Distance d | Refractive Index Nd | Abbe Number vd |
| --- | --- | --- | --- | --- |
| (Object) | Infinity | Infinity | | |
| 1(Stop) | Infinity | −0.1050 | | |
| 2* | 2.4078 | 0.4000 | 1.544 | 55.86 (vd1) |
| 3* | −180.0000 | 0.1871 | | |
| 4* | 5.8634 | 0.2000 | 1.661 | 20.37 (vd2) |
| 5* | 2.2637 | 0.1300 | | |
| 6* | 4.1472 | 0.4678 | 1.535 | 55.66 (vd3) |
| 7* | −5.6330 | 0.4554 | | |
| 8* | −2.7043 | 0.4180 | 1.535 | 55.66 (vd4) |
| 9* | −1.2836 | 0.1065 | | |
| 10* | Infinity | 0.3135 | 1.661 | 20.37 (vd5) |
| 11* | Infinity | 0.1630 | | |

TABLE 6-continued

Example6
Unit mm
f = 3.04
ih = 2.93
Fno = 1.90
TTL = 4.16
ω(°) = 43.5

| | | | | |
|---|---|---|---|---|
| 12* | 1.3668 | 0.3388 | 1.535 | 55.66 (vd6) |
| 13* | 0.7150 | 0.5000 | | |
| 14 | Infinity | 0.1100 | 1.517 | 64.20 |
| 15 | Infinity | 0.4316 | | |
| Image Plane | Infinity | | | |

Constituent Lens Data

| Lens | Start Surface | Focal Length | Composite Focal Length | | Entrance pupil diameter | |
|---|---|---|---|---|---|---|
| 1 | 2 | 4.369 | f456 | 175.445 | EPd | 1.599 |
| 2 | 4 | −5.707 | | | | |
| 3 | 6 | 4.542 | | | | |
| 4 | 8 | 4.144 | | | | |
| 5 | 10 | Infinity | | | | |
| 6 | 12 | −3.425 | | | | |

Aspheric Surface Data

| | Second Surface | Third Surface | Fourth Surface | Fifth Surface | Sixth Surface | Seventh Surface |
|---|---|---|---|---|---|---|
| k | −2.985705E+00 | 0.000000E+00 | 2.559631E+01 | −3.605897E+00 | −8.762053E−01 | 0.000000E+00 |
| A4 | −1.390748E−02 | −1.597718E−01 | −3.907176E−01 | −4.053942E−01 | −2.578751E−01 | −1.003193E−01 |
| A6 | 5.976768E−01 | 1.049534E+00 | 6.136478E−01 | 6.462080E−01 | 8.004386E−01 | −2.051129E−01 |
| A8 | −9.283375E+00 | −7.232637E+00 | −1.546781E+00 | −6.485350E−01 | −2.888753E+00 | 2.011254E+00 |
| A10 | 6.186085E+01 | 3.223027E+01 | 6.112597E+00 | −7.513583E−01 | 5.697645E+00 | −8.247244E+00 |
| A12 | −2.391415E+02 | −9.243201E+01 | −2.318377E+01 | 4.181717E+00 | −4.215884E+00 | 1.816175E+01 |
| A14 | 5.567198E+02 | 1.676545E+02 | 5.469287E+01 | −9.442703E+00 | −4.581766E+00 | −2.343985E+01 |
| A16 | −7.706640E+02 | −1.864530E+02 | −7.719703E+01 | 1.217606E+01 | 1.118635E+01 | 1.766212E+01 |
| A18 | 5.847130E+02 | 1.104196E+02 | 6.090753E+01 | −8.275259E+00 | −7.847413E+00 | −7.199312E+00 |
| A20 | −1.873810E+02 | −3.155062E+01 | −2.107985E+01 | 2.277556E+00 | 1.935243E+00 | 1.230151E+00 |

| | Eighth Surface | Ninth Surface | Tenth Surface | Eleventh Surface | Twelfth Surface | Thirteenth Surface |
|---|---|---|---|---|---|---|
| k | 4.064632E+00 | −1.050000E+00 | 0.000000E+00 | 0.000000E+00 | −5.289111E−01 | −3.727928E+00 |
| A4 | −2.573995E−01 | −2.766759E−01 | 3.888641E−01 | 8.437897E−01 | −3.461424E−01 | −1.829302E−01 |
| A6 | 2.882383E−01 | 1.259243E+00 | −2.280462E−01 | −1.715003E+00 | −1.765683E−02 | 3.899889E−02 |
| A8 | 1.808829E+00 | −2.871052E+00 | −1.038565E+00 | 1.733905E+00 | 1.817372E−02 | 4.431452E−02 |
| A10 | −8.189562E+00 | 3.977860E+00 | 2.176487E+00 | −1.089589E+00 | 8.544301E−02 | −4.393057E−02 |
| A12 | 1.537681E+01 | −3.775364E+00 | −2.051232E+00 | 4.444795E−01 | −7.747175E−02 | 1.905763E−02 |
| A14 | −1.595604E+01 | 2.586115E+00 | 1.104403E+00 | −1.168098E−01 | 2.945371E−02 | −4.786770E−03 |
| A16 | 9.515236E+00 | −1.176986E+00 | −3.500879E−01 | 1.878678E−02 | −5.885671E−03 | 7.161917E−04 |
| A18 | −3.165005E+00 | 3.041947E−01 | 6.119671E−02 | −1.636260E−03 | 5.122658E−04 | −5.948361E−05 |
| A20 | 4.403195E−01 | −3.304744E−02 | −4.592540E−03 | 5.599829E−05 | −2.634942E−05 | 2.115885E−06 |

The imaging lens in Example 6 satisfies conditional expressions (1) to (18) as shown in Table 7.

Figure 12:
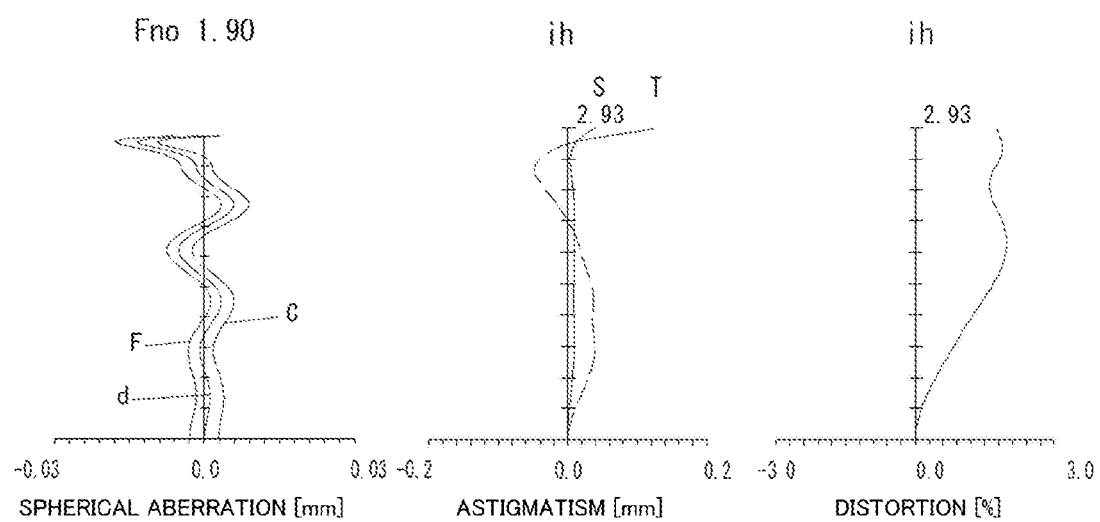
FIG. 12 shows spherical aberration, astigmatism, and distortion of the imaging lens in Example 6 according to the present invention.

FIG. 12 shows spherical aberration (mm), astigmatism (mm), and distortion (%) of the imaging lens in Example 6. As shown in FIG. 12, each aberration is corrected excellently.

In table 7, values of conditional expressions (1) to (18) related to the Examples 1 to 6 are shown.

TABLE 7

| Conditional expression | Example1 | Example2 | Example3 | Example4 | Example5 | Example6 |
|---|---|---|---|---|---|---|
| (1) (D1/f1) × 100 | 7.40 | 8.39 | 9.28 | 8.06 | 7.63 | 9.16 |
| (2) (T2/TTL) × 100 | 3.31 | 3.35 | 3.17 | 3.11 | 3.60 | 3.12 |
| (3) (T5/TTL) × 100 | 3.97 | 3.52 | 3.83 | 3.83 | 3.84 | 3.91 |
| (4) vd5/vd6 | 0.37 | 0.37 | 0.37 | 0.37 | 0.37 | 0.37 |
| (5) (D3/f3) × 100 | 10.25 | 9.77 | 10.26 | 10.71 | 10.58 | 10.30 |
| (6) r8/r11 | −0.85 | −0.85 | −0.95 | −0.90 | −0.90 | −0.94 |
| (7) (D4/f4) × 100 | 13.14 | 13.17 | 10.81 | 12.55 | 12.20 | 10.09 |
| (8) (T1/TTL) × 100 | 4.60 | 4.81 | 4.12 | 4.65 | 4.41 | 4.01 |
| (9) T2/T3 | 0.37 | 0.35 | 0.30 | 0.30 | 0.35 | 0.29 |
| (10) f3/f4 | 1.36 | 1.40 | 1.15 | 1.20 | 1.22 | 1.10 |

TABLE 7-continued

| Conditional expression | Example1 | Example2 | Example3 | Example4 | Example5 | Example6 |
|---|---|---|---|---|---|---|
| (11) \|r2\|/f | 2.15 | 2.37 | 64.63 | 3.79 | 2.87 | 59.24 |
| (12) r3/f | 1.65 | 1.66 | 1.97 | 1.50 | 1.51 | 1.93 |
| (13) r11/f | 0.45 | 0.45 | 0.44 | 0.45 | 0.45 | 0.45 |
| (14) f456/f | 7.53 | 6.65 | 25.39 | 11.73 | 13.74 | 57.75 |
| (15) (T3/TTL) × 100 | 8.86 | 8.65 | 10.42 | 10.32 | 10.39 | 10.94 |
| (16) r5/r6 | −0.43 | −0.35 | −0.62 | −0.35 | −0.47 | −0.74 |
| (17) r6/f | −2.74 | −3.23 | −2.12 | −3.08 | −2.52 | −1.85 |
| (18) TTL/EPd | 2.65 | 2.65 | 2.51 | 2.65 | 2.57 | 2.60 |

When the imaging lens according to the present invention is adopted to a product with the camera function, there is realized contribution to the wide field of view, the low-profileness and the low F-number of the camera and also to high performance thereof.

DESCRIPTION OF REFERENCE NUMERALS

ST: aperture stop
L1: first lens
L2: second lens
L3: third lens
L4: fourth lens
L5: fifth lens
L6: sixth lens
ih: maximum image height
IR: filter
IMG: imaging plane

What is claimed is:

1. An imaging lens comprising in order from an object side to an image side,
a first lens having a convex surface facing the object side near an optical axis and positive refractive power,
a second lens having negative refractive power near the optical axis,
a third lens,
a fourth lens,
a fifth lens being double-sided aspheric lens, and
a sixth lens having a concave surface facing the image side near the optical axis and negative refractive power, wherein an image-side surface of said sixth lens is formed as an aspheric surface having at least one off-axial pole point, an image-side surface of said third lens is a convex surface facing the image side at the optical axis, said fourth lens has positive refractive power near the optical axis, and below conditional expressions (1) and (3) are satisfied:

$$5.00 < (D1/f1) \times 100 < 10.00 \quad (1)$$

$$2.50 < (T5/TTL) \times 100 < 4.70 \quad (3)$$

where
D1: a thickness along the optical axis of the first lens,
f1: a focal length of the first lens,
T5: a distance along the optical axis from an image-side surface of the fifth lens to an object-side surface of the sixth lens, and
TTL: a total track length.

2. The imaging lens according to claim 1, wherein an object-side surface and an image-side surface of said fifth lens are plane surfaces near the optical axis.

3. The imaging lens according to claim 1, wherein a below conditional expression (2) is satisfied:

$$2.20 < (T2/TTL) \times 100 < 4.70 \quad (2)$$

where
T2: a distance along the optical axis from an image-side surface of the second lens to an object-side surface of the third lens, and
TTL: a total track length.

4. The imaging lens according to claim 1, wherein a below conditional expression (7) is satisfied:

$$5.00 < (D4/f4) \times 100 < 19.00 \quad (7)$$

where
D4: a thickness along the optical axis of the fourth lens, and
f4: a focal length of the fourth lens.

5. The imaging lens according to claim 1, wherein a below conditional expression (8) is satisfied:

$$2.50 < (T1/TTL) \times 100 < 6.50 \quad (8)$$

where
T1: a distance along the optical axis from an image-side surface of the first lens to an object-side surface of the second lens, and
TTL: a total track length.

6. The imaging lens according to claim 1, wherein a below conditional expression (9) is satisfied:

$$0.20 < T2/T3 < 0.45 \quad (9)$$

where
T2: a distance along the optical axis from an image-side surface of the second lens to an object-side surface of the third lens, and
T3: a distance along the optical axis from an image-side surface of the third lens to an object-side surface of the fourth lens.

7. The imaging lens according to claim 1, wherein a below conditional expression (10) is satisfied:

$$0.80 < f3/f4 < 1.65 \quad (10)$$

where
f3: a focal length of the third lens, and
f4: a focal length of the fourth lens.

8. The imaging lens according to claim 1, wherein a below conditional expression (6) is satisfied:

$$-1.15 < r8/r11 < -0.70 \quad (6)$$

where
r8: paraxial curvature radius of an image-side surface of the fourth lens, and
r11: paraxial curvature radius of an object-side surface of the sixth lens.

9. The imaging lens according to claim 1, wherein a below conditional expression (11) is satisfied:

$$1.70 < |r2|/f \quad (11)$$

where
r2: paraxial curvature radius of an image-side surface of the first lens, and f: a focal length of the overall optical system of the imaging lens.

10. The imaging lens according to claim 1, wherein a below conditional expression (12) is satisfied:

$$1.20 < r3/f < 3.00 \quad (12)$$

where r3: paraxial curvature radius of an object-side surface of the second lens, and f: a focal length of the overall optical system of the imaging lens.

11. The imaging lens according to claim 1, wherein a below conditional expression (13) is satisfied:

$$0.20 < r11/f < 0.60 \quad (13)$$

where r11: paraxial curvature radius of an object-side surface of the sixth lens, and f: a focal length of the overall optical system of the imaging lens.

* * * * *